United States Patent
Arana-Manzano et al.

(10) Patent No.: US 7,085,370 B1
(45) Date of Patent: Aug. 1, 2006

(54) RINGBACK DETECTION CIRCUIT

(75) Inventors: Manuel Rosendo Arana-Manzano, Durham, NC (US); Eric Douglas Romesburg, Chapel Hill, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 803 days.

(21) Appl. No.: 09/608,051

(22) Filed: Jun. 30, 2000

(51) Int. Cl.
    *H04M 1/00* (2006.01)
(52) U.S. Cl. .................................. 379/377; 379/386
(58) Field of Classification Search ........... 379/392.01, 379/406.04, 377, 386, 372, 406; 370/287; 455/570
    See application file for complete search history.

(56) References Cited

U.S. PATENT DOCUMENTS

| | | | |
|---|---|---|---|
| 3,894,200 A | * | 7/1975 | Campanella et al. .. 379/406.11 |
| 4,696,031 A | * | 9/1987 | Freudberg et al. .......... 379/386 |
| 5,390,244 A | * | 2/1995 | Hinman et al. ............. 379/386 |
| 5,450,484 A | * | 9/1995 | Hamilton .................... 379/351 |
| 5,483,579 A | | 1/1996 | Stogel |
| 5,539,812 A | * | 7/1996 | Kitchin et al. .............. 379/189 |
| 5,588,053 A | * | 12/1996 | Xie ............................. 379/386 |
| 5,649,012 A | * | 7/1997 | Gupta et al. ........... 379/406.09 |
| 5,689,556 A | | 11/1997 | Gupta et al. |
| 5,809,463 A | * | 9/1998 | Gupta et al. ................ 704/233 |
| 6,081,732 A | * | 6/2000 | Suvanen et al. ............ 455/570 |

* cited by examiner

*Primary Examiner*—Sinh Tran
*Assistant Examiner*—Walter F Briney, III
(74) *Attorney, Agent, or Firm*—Coats & Bennett, P.L.L.C.

(57) ABSTRACT

A ringback detector determines whether ringback by comparing measurements of a characteristic of the received signal, such as the energy of the received signal, to a threshold. The threshold is set initially to a low value and then updated based on the measurements of received signal. The measurements are then compared to the threshold to determine whether ringback is present. An output signal indicative of ringback is generated when ringback is present.

31 Claims, 8 Drawing Sheets

RINGBACK DETECTION CIRCUIT

BACKGROUND OF THE INVENTION

The present invention relates generally to ringback detection circuits for communication terminals and, more particularly, to an adaptive ringback detection circuit that dynamically updates thresholds used for ringback detection.

Ringback is a tone heard by the user of a communication terminal that initiates a call until the call connects. Typically, the ringback is composed of two or more different tones, but single tone ringbacks are known. There is no standard for ringback frequency and cadences. For example, a typical PBX can be configured to generate different tones and cadences according to customer preferences. The wide variety in the composition of ringback tones makes the task of detecting ringback more difficult.

If not detected, ringback may cause problems for adaptive algorithms, such as a voice activity detector (VAD), noise suppressor, acoustic echo canceller (AEC), network echo canceller (NEC), noise estimator, and channel gain estimator. Voice activity detectors treat ringback as noise after a few hundred milliseconds when they should continue to indicate voice. The voice activity detector, in turn, controls the noise suppressor so that the noise suppressor trains only when there is no voice. If the voice activity detector mistakes ringback for noise, this mistake will cause the noise suppressor to train, also by mistake, on ringback. When voice follows ringback, the voice activity detector may not detect such voice because its internal noise threshold is too high.

Ringback can also cause false training in the acoustic echo canceller and network echo canceller. False training occurs when the acoustic echo canceller and network echo canceller diverge due to ambiguity caused by the cross correlation between the two inputs being high at multiples of the period of the ringback. Also, at the beginning of the call, the network linear echo canceller is not trained, so the network residual echo suppressor (NNLP, for network non-linear processor) removes all of the network echo at this point. The NNLP can cut out or distort the ringback signal.

Another problem with ringback occurs in phones with noise estimators. Noise estimators are used to generate comfort noise during periods when speech is not present. Ringback may cause the noise estimator to generate a high estimate of noise because the ringback has high amplitude and continues for several seconds. Since the noise estimate is used by the comfort noise generator, the comfort noise may be initially high and decay when ringback ends. This can be an annoyance to the user.

In some circumstances, ringback may cause an error in channel gain calculation. This problem may occur when the ringback is a single tone and its frequency coincides with one of the nulls of the transfer function of the echo path causing the channel gain estimator to think that the gain of the channel is 0.

Like ringback, other tones can cause problems for adaptive algorithms. For example, dual tone multi-frequency (DTMF) tones can be transmitted when a user accidentally presses keys while engaged in a call. DTMF tones have substantially higher amplitudes than voice signals and cause the same problems as ringback at the receiver.

Ringback detection is not a problem in landline systems, since landline systems (MSC, BSTN, base station, etc.) have information about when the call connects. These landline systems can simply turn off adaptive algorithms until the call connects. A problem may, however, occur when the user is transferred to a different extension. In some office systems, ringback may occur when a call is transferred from one extension to another. In this case, the adaptive algorithms may falsely train on the ringback as previously described.

U.S. Pat. No. 5,450,484 discloses a method for detecting ringback in the downlink signal at a mobile terminal. To briefly summarize, a predetermined number of frames, referred to as a window, are captured. The captured frames are analyzed and ringback declared if three conditions are met: 1) the total energy of the frames in the window is greater than a predetermined threshold for ringback; 2) the number of frames where the frequency of the two largest peaks falls within a predetermined range is greater than a predetermined threshold; and 3) the energy of any frame in that window is above a predetermined minimum threshold. This method, while an improvement over no ringback detection, still has significant drawbacks. Using the method described above, a single tone ringback will not be detected because the second condition will not be satisfied. That is, the ringback detection circuit will not be able to find a second energy peak inside the predetermined frequency range. Also, the use of predetermined thresholds and frequency ranges narrows the detection capability of the ringback detection circuit. For example, ringback frequencies outside the predetermined frequency range will prevent the ringback from being detected by the ringback detection circuit. A similar problem would occur in ringback signals that fail to meet the predetermined thresholds. Finally, the method described in the aforementioned patent delays the decision until a predetermined number of frames are captured and analyzed. By the time that ringback is detected, the adaptive algorithms may already have diverged.

BRIEF SUMMARY OF THE INVENTION

The present invention is a ringback detection circuit for a communication terminal. Ringback detection is based on a comparison of the energy of a received signal to a threshold. The threshold is initialized to 0 or some other low value at the beginning of a call. The threshold is increased based on the energy of the received signal. Ringback is determined to exist when the energy of the received signal equals or exceeds the threshold. Since the threshold is initially set to a low value, the present invention achieves fast detection of ringback. The energy level of the received signal will decrease when ringback ends. It is to be noted that when the energy begins decreasing, the threshold is not updated but instead remains at the current level immediately preceding the decrease in energy. Eventually, the energy of the received signals drops below the threshold indicating that ringback is no longer present.

The output of the ringback detection circuit is a Boolean signal that indicates whether ringback, or other high amplitude tone (e.g. DTMF tone), is present in the received signal. The output signal from the ringback detection circuit may be used, for example, as a control signal to control audio processing circuits in the communication terminal. For example, the output signal can be used to control the mode of an audio processing circuit. Many audio processing circuits, such as voice activity detectors, echo cancellers, noise estimators, and channel gain estimators, include adaptive algorithms. The output of the ringback detection circuit may also be used to freeze these adaptive algorithms. The output signal may also be used enable and disable audio processing circuits, such as a residual echo processor. Other uses for the output of the ringback detection circuit are possible and the above examples are not intended to be limiting but are merely illustrative of some of the uses for the ringback detection circuit.

DETAILED DESCRIPTION OF THE PREFERRED EMBODIMENTS

Figure 1:
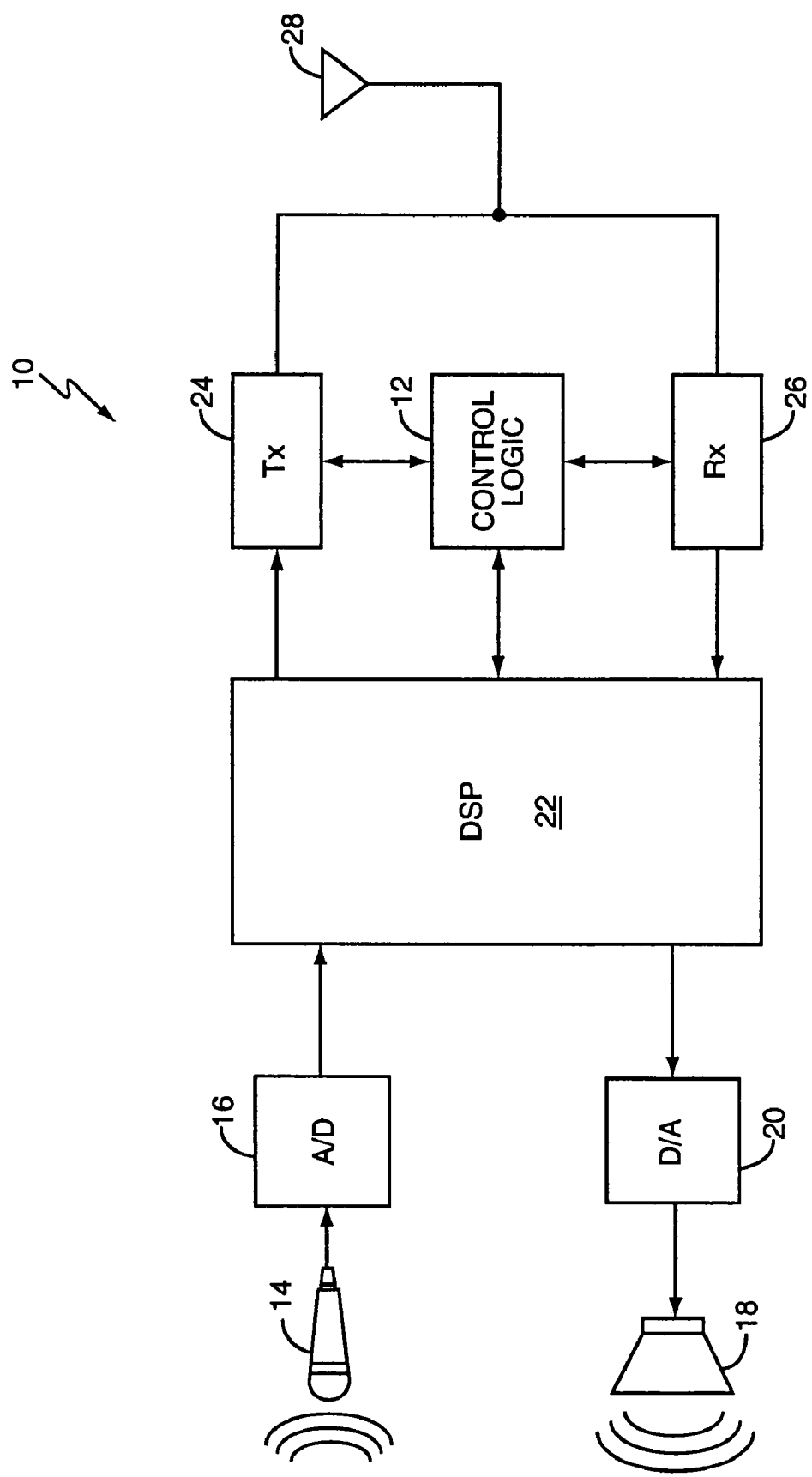
FIG. 1 is a functional block diagram illustrating the components of a mobile terminal.

FIG. 1 is a functional block diagram of an exemplary mobile terminal 10 with a ringback detection circuit 100. Mobile terminal 10 includes control logic 12, microphone 14, analog-to-digital converter 16, speaker 18, digital-to-analog converter 20, digital signal processor 22, transmitter 24, receiver 26, and antenna 28. Control logic 12 controls the operation of the mobile terminal 10 according to stored program instructions. These program instructions can be stored in internal memory within the control logic 12 or in an external memory (not shown). Control logic 12 may be implemented in a single microprocessor or in multiple processors. In the transmit chain, microphone 14 receives acoustic signals from the user and converts the acoustic signals to analog, electrical signals. The analog signals from microphone 14 are converted to digital signals by analog-to-digital converter 16. The digital signals output by the analog-to-digital converter 16 are passed to the digital signal processor (DSP) 22 which processes the digital signals for transmission by transmitter 24. DSP 22 typically includes a speech coder (not shown) and channel coder (not shown) for processing the digitized speech signals to prepare them for transmission. The speech coder compresses the digital signal and the channel coder inserts error detection and error correction codes and signaling information in accordance with the requirements of the particular mobile communication system. Transmitter 24, which includes a modulator and RF amplifier, converts the output from the DSP 22 into a signal suitable for transmission by antenna 28. In the received chain, radio frequency (RF) signals received by antenna 28 are passed to receiver 26. Receiver 26 shifts the frequency spectrum of the received RF signals and amplifies them to a level appropriate for subsequent processing by digital signal processor 22. Receiver 26 typically includes an equalizer to compensate for phase and amplitude distortions in the channel-corrupted signal, a demodulator for extracting bit sequences from the received signal, and a detector for determining transmitted bits based on the extracted sequences. The demodulated bits from the receiver 26 are passed to the DSP 22, which typically includes an error decoder and speech decoder. Error decoder detects and corrects bit errors in the received signal. Speech decoder processes speech data which is output to the digital-to-analog converter 20. Control and signaling data is passed to control logic 12. Digital-to-analog converter 20 converts the digitized speech into an analog speech signal which drives speaker 18 to produce an audible output, e.g., voice.

Figure 2:
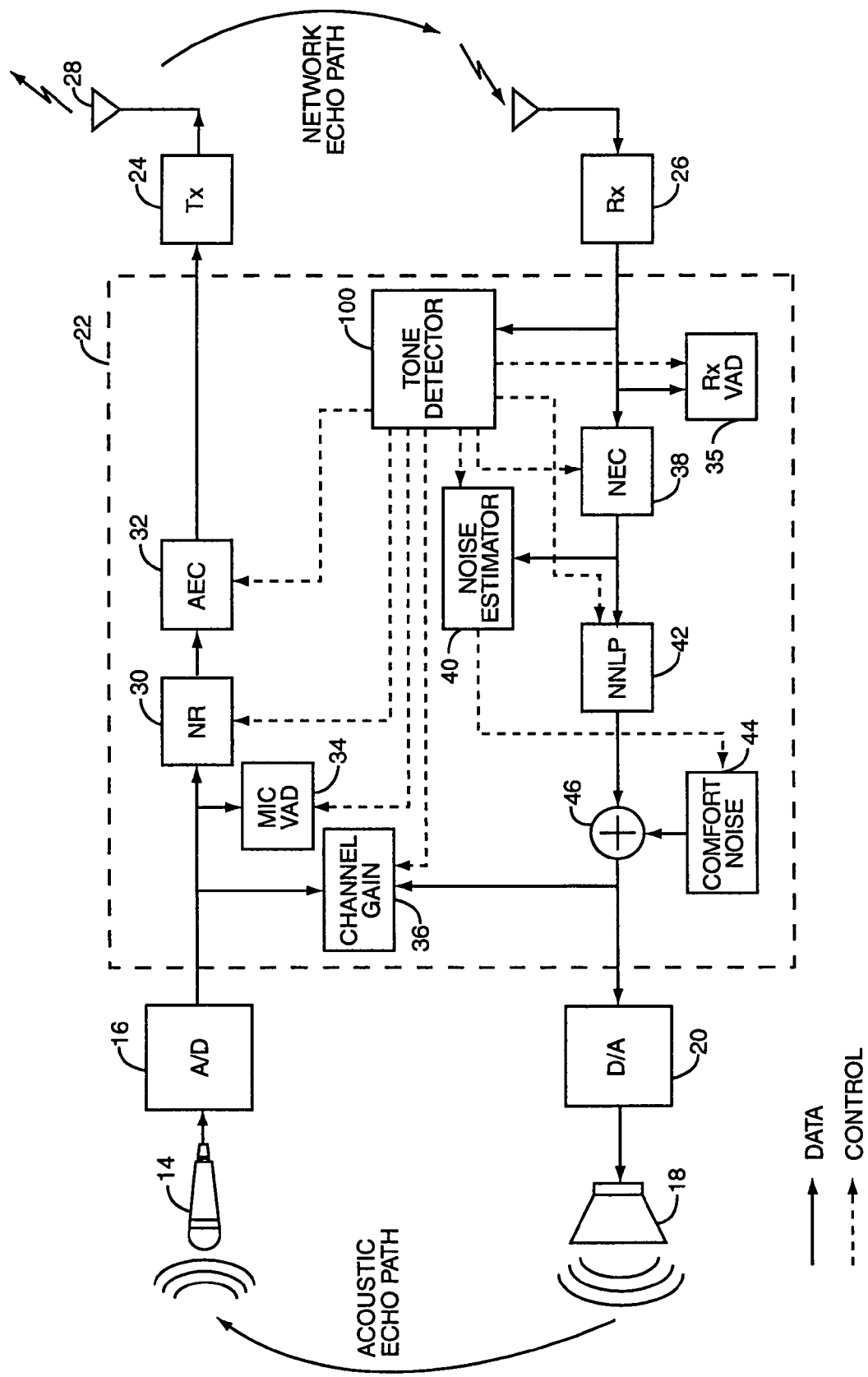
FIG. 2 is a functional block diagram illustrating the components of a digital signal processor incorporating a ringback detection circuit for a mobile terminal.

FIG. 2 is a more detailed diagram of the digital signal processor 22. Digital signal processor 22 includes, in addition to the elements described above, a noise reduction unit 30, acoustic echo canceller 32, voice activity detector 34, channel gain estimator 36, network echo canceller 38, noise estimator 40, residual echo suppressor 42, comfort noise generator 44, and ringback detection circuit 100. With the exception of the ringback detection circuit 100, each of these components of the digital signal processor 22 are conventional and are well known in the art. Noise reduction unit 30 serves to cancel noise present in a speech signal prior to transmission. Acoustic echo canceller 32 produces an estimate of the acoustic echo, which is then subtracted from the speech signal. Voice activity detector 34 detects the presence of speech and generates a signal used to control other elements, such as the noise reduction unit 30. The channel gain estimator 36 produces an estimate of the channel gain. Network echo canceller 38 produces an estimate of the network echo, which is then subtracted from the received signal. Noise estimator 40 produces an estimate of noise in the received signal which is passed to the comfort noise generator 44. Comfort noise generator 44 uses the noise estimate from noise estimator 40 to generate comfort noise to compensate for noise removed by the residual echo suppressor 42. The comfort noise is combined at node 46 with the output of the residual echo suppressor 42. Residual echo suppressor 42 functions to further reduce residual echo left in the output of the network echo canceller 38.

Digital signal processor 22 further includes a ringback detection circuit 100. Ringback detection circuit 100 detects the presence of ringback in the received signal and generates a control signal to "freeze" adaptive algorithms such as noise reduction circuit 30, acoustic echo canceller 32, network echo canceller 38, noise estimator 40, and voice activity detectors 34 and 35. In the present invention, the output of ringback detection circuit 100 may be used control the residual echo suppressor 42 by placing the residual echo suppressor in a bypass mode when ringback is present.

Many algorithms are known for ringback detection. The present invention differs from prior art ring detection algorithms in several respects. First, ringback detection circuit 100 compares the signal energy of the received signal to an adaptive threshold to detect ringback in the received signal. Second, the threshold used for ringback detection is based on the signal since the beginning of the call. In an exemplary embodiment, the threshold is initially set to 0 (or a very low level) at the beginning of a call and is updated following each frame based on the energy of the signal during that frame. Ringback is declared whenever the signal energy is greater than the threshold. Since the threshold is initially low, fast detection of ringback is achieved so that adaptive algorithms can be frozen during frames containing ringback. When ringback ends, e.g., the call connects, adaptive algorithms remain frozen for a predetermined number of frames so that the tail end of the ringback signal extending beyond the last frame boundary does not distort adaptive algorithms.

Figure 3:
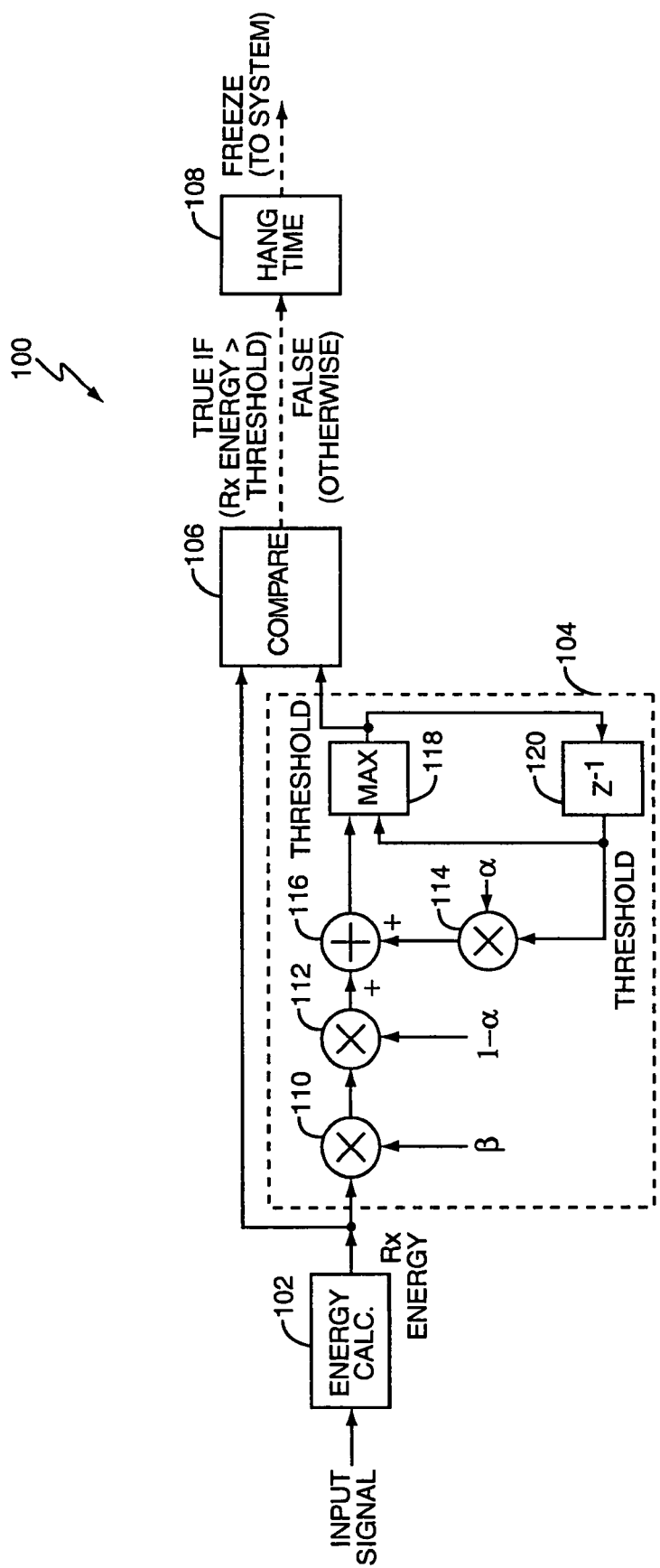
FIG. 3 is a functional block diagram illustrating the components of the ringback detection circuit.

FIG. 3 is a block diagram of the ringback detection circuit 100 of the present invention. Ringback detection circuit 100 comprises an energy calculator 102, threshold calculator 104, comparator 106, and hang-time circuit 108. Energy calculator 102 calculates the energy of the received signal. The received signal energy is input to the threshold calculator 104, which uses the received signal energy to update the detection threshold. The received signal energy from energy calculator 102 and threshold from threshold calculator 104 are applied to the inputs of comparator 106. Comparator 106 outputs a Boolean output signal indicating the presence or absence of ringback. The output signal from comparator 106 is input to a hang-time circuit 108 that delays transitions of the output signal from true to false a predetermined number of frames. Adding hang-time to the output signal prevents the tail end of the ringback signal from distorting adaptive algorithms. This problem can occur when the total energy in the tail end of the ringback signal is below the predetermined threshold but, nevertheless, significant enough to cause error in the adaptive algorithms.

Threshold calculator 104 includes multipliers 110, 112, 114, adder 116, max function 118, and delay element 120. The received signal energy is multiplied by multiplier 110 by a noise margin $\beta$. Noise margin $\beta$ may be any number between 0 and 1 inclusive. The exemplary embodiment uses a noise margin equal to ½. The output of node 110 is multiplied by a filtering coefficient 1-$\alpha$ (where $\alpha$ is the pole of an infinite impulse response (IIR) filter) by multiplier 112. The pole $\alpha$ of the IIR may have a value less than 1 but greater than or equal to 0. If $\alpha$ is equal to 0, no filtering is performed. The current threshold is also multiplied by the pole $\alpha$ of the IIR filter by multiplier 114. The output from multipliers 112 and 114 are added by an adder 116. The output of adder 116 is applied to one input of a max function 118. The previous threshold is applied to a second input of the max function 118. Max function 118 outputs a new threshold based on these two inputs. The new threshold output from the max function 118 is applied to comparator 106. The newly calculated threshold is also stored in a delay element 120 to use in calculating the threshold in the next frame.

Figure 4:
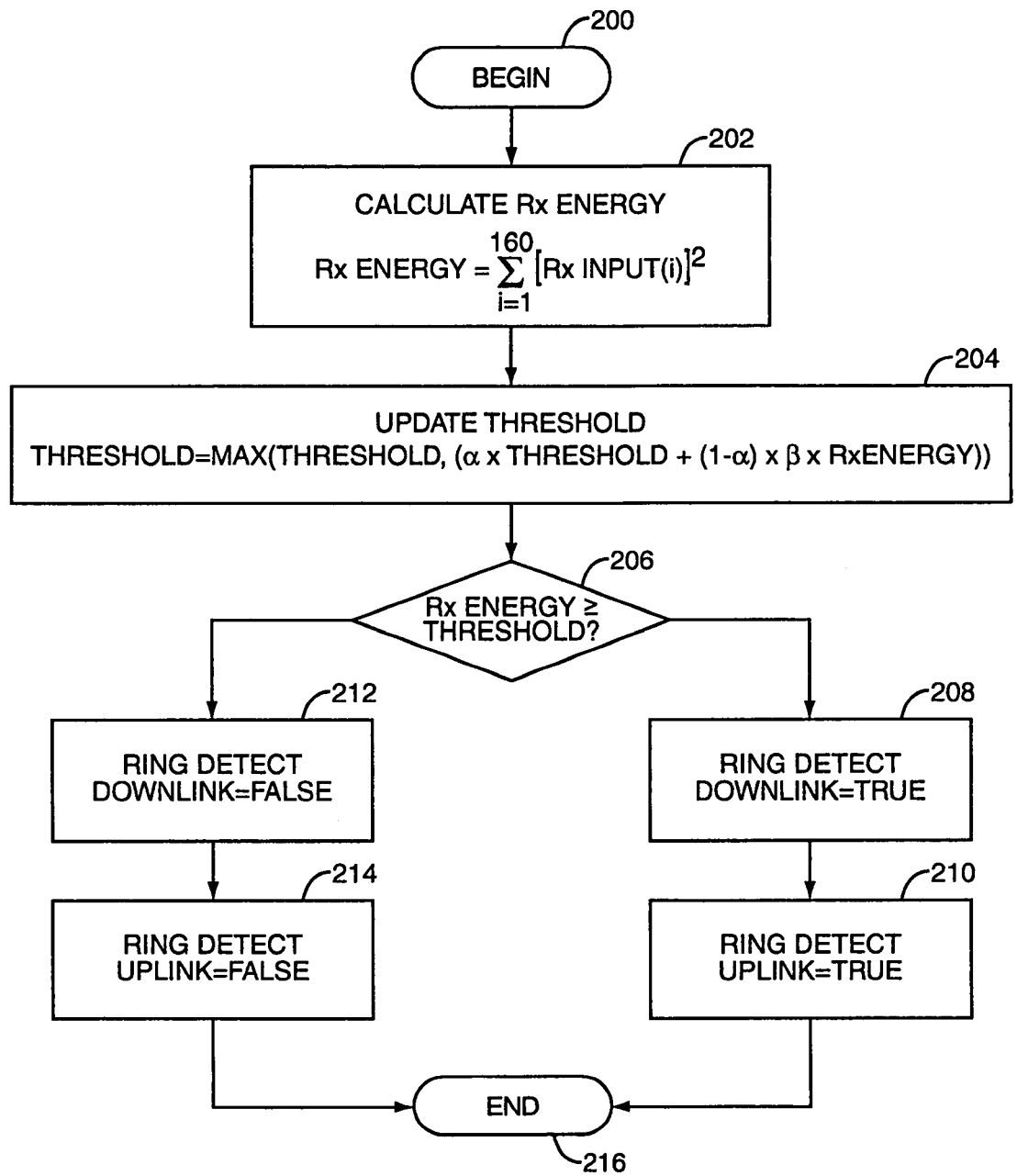
FIG. 4 is a flow diagram illustrating the operation of the ringback detection circuit.

FIG. 4 is a flow diagram illustrating the operation of the ring detection circuit 100. A call is initiated by the user at block 200. In block 202, ring detector 100 measures the energy over a frame. In a standard time division multiple access (TDMA) system operating according to Telecommunications Standards Association/Electronics Industry Association standard TIA/EIA-136, the frame size is 20 ms or one hundred sixty samples. The invention, however, is not limited to TDMA systems. In one exemplary embodiment, the total energy for the frame is computed as the sum of the squares of the input signal over the frame. The calculated energy of the received signal over a frame is input to the threshold calculator which computes at block 204 a new ringback threshold. The calculated energy of the received signal over a frame and the new ringback threshold are input to comparator 106. Comparator 106 compares the energy of the received signal over the frame to the threshold from threshold calculator 104 at block 206. Comparator 106 determines whether ringback is present based on those comparisons. In the exemplary embodiment, ringback is determined to exist when the energy of the received signal is greater than or equal to the ringback threshold. In this case, comparator outputs a logical high (true) (blocks 208, 210). If the energy of the received signal is less than the predetermined threshold, comparator 106 outputs a logical low indicating no ringback (blocks 212, 214). In the exemplary embodiment, the output signal from the comparator 106 is input to hang-time circuit 108. Hang-time circuit 108 functions to freeze the output signal at a logical high for a predetermined number of frames after ringback ceases. The change from a logical low (indicating no ringback) to a logical high (indicating ringback) is not delayed by hang-time circuit 108. The output of the ringback detection circuit 100 may be further delayed to compensate for timing differences within the audio processing circuits. For example, the acoustic echo canceller is not likely to see the effects of ringback until some time after the ringback affects the network echo canceller because of delays inherent in the audio processing circuits and echo path. Delay elements can be used to compensate for such timing differences.

Figure 5:
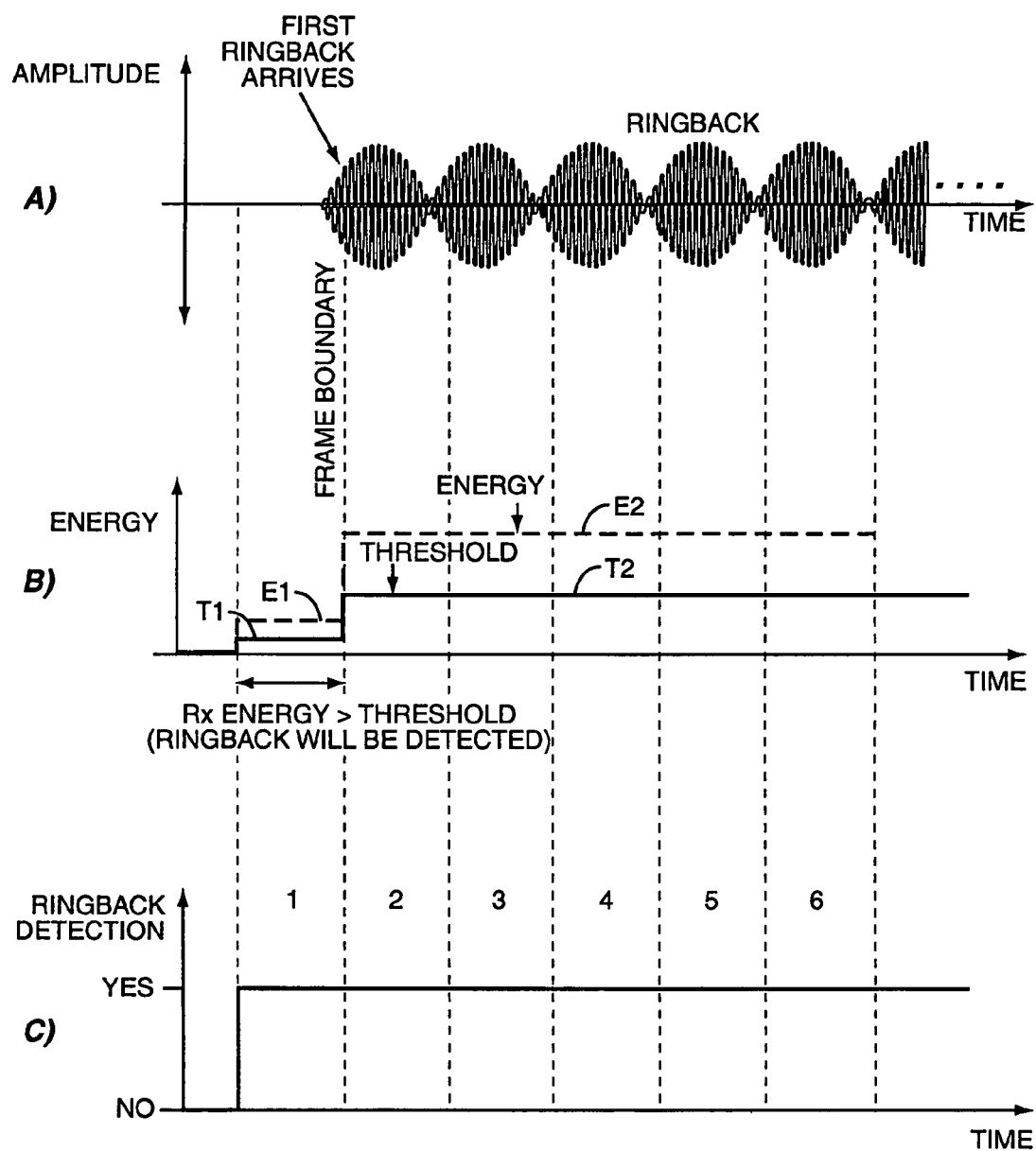
FIGS. 5A through 5C are time diagrams illustrating the operation of the ringback detection circuit at the beginning of a call.

Since ringback doesn't necessarily begin exactly on a frame boundary, initializing the threshold to 0 (or some other low value) and increasing the threshold when higher energy is present allows detection of the leading edge of ringback. FIG. 5A illustrates a ringback signal in the time domain. Note that in FIG. 5A, the ringback signal starts in the latter half of the first frame containing ringback. The leading end of the ringback signal, i.e., the portion in the first frame, contributes to the total energy of the first frame as seen in FIG. 2B. The energy during the first frame is E1. Ringback detection circuit 100 updates the threshold from T0 to T1. Since energy E1 during the first frame is greater than the threshold T1, ringback is declared as seen in FIG. 5C. In the second frame, ringback is present during the entire frame. The energy of the received signal during the second frame, indicated as E2, is higher than in the first frame. Ringback detection circuit 100 updates the ringback threshold from T1 to T2 in the second frame. In this example, the energy of the received signal remains substantially constant since the ringback is a periodic signal. Therefore, the threshold remains at T2 in subsequent frames. Since the energy E2 in the second and subsequent frames is greater than the threshold T2, ringback detection circuit 100 indicates ringback as seen in FIG. 5C. Thus, FIG. 5 illustrates how initializing the threshold to a low value allows fast detection of ringback.

Figure 6:
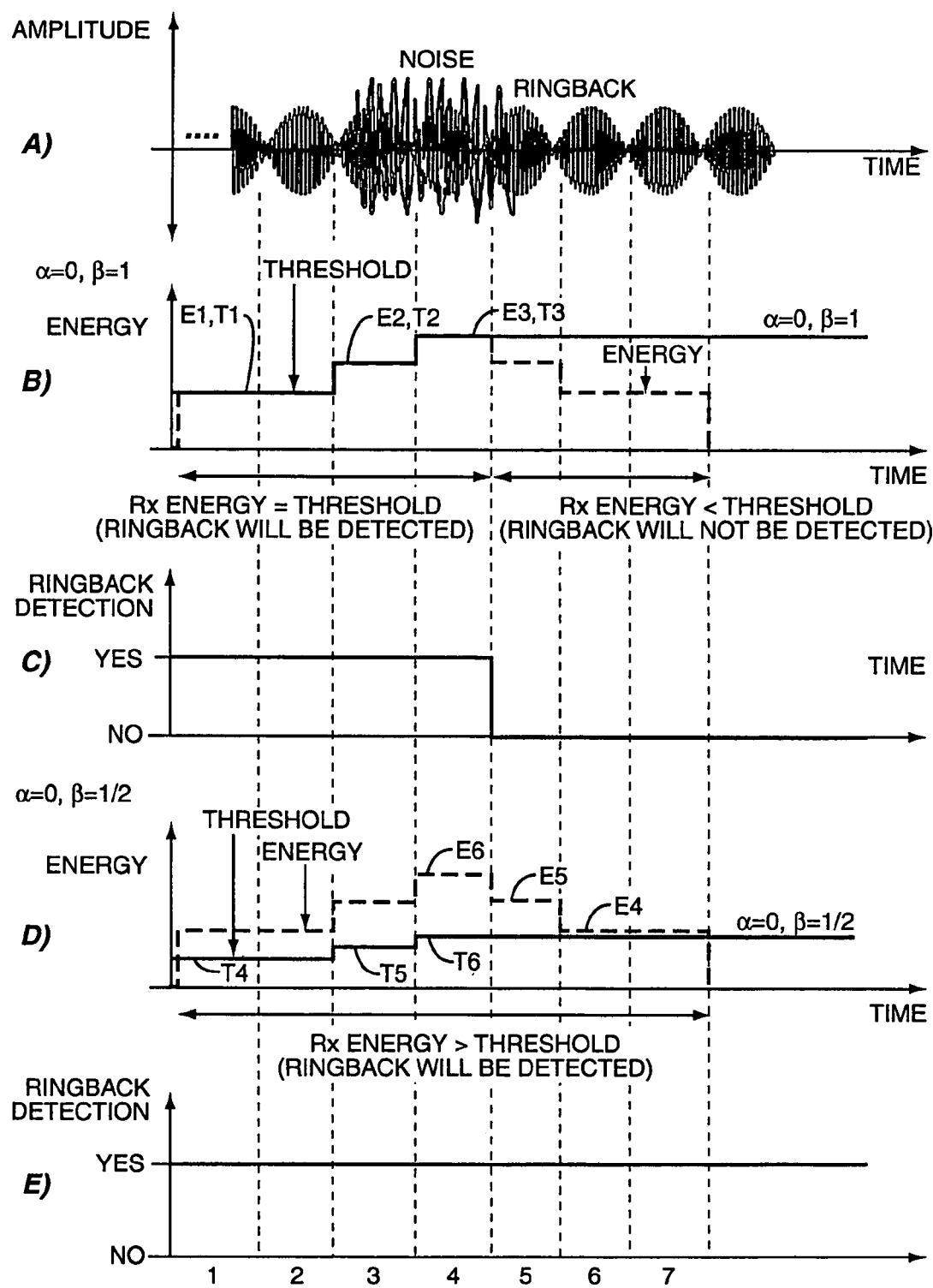
FIGS. 6A through 6E are time diagrams illustrating the operation of the ringback detection circuit for different values of noise margin.

Ringback detection circuit 100 of the present invention also takes into account the possibility of noise in the ringback signal. FIG. 6A illustrates a ringback signal in the time domain that has been corrupted by noise. Noise in the ringback signal contributes to the total energy of the received signal. Since ringback detection circuit 100 uses the energy of the received signal to update the ringback threshold, the presence of noise, if unchecked, tends to drive the threshold to higher levels. When noise ceases, the energy of the received signal will decrease, possibly below the threshold, causing the ringback detection circuit 100 to mistakenly indicate no ringback. This effect is shown in FIGS. 6B through 6D. FIG. 6B is a graph of the signal energy and threshold where $\alpha$ is equal to 0 and $\beta$ is equal to 1. FIG. 6C shows the output of the ringback detection circuit 100. As seen in FIG. 6B, the threshold assumes value T1 in the frame preceding the start of noise. The signal energy is E1. Note that the threshold T1 and signal energy E1 are equal. In the first frame where noise is present, the signal energy over the frame is E2 and the threshold is T2. Again, the threshold T2 is equal to the signal energy E2. In the next frame (the first full frame of noise), signal energy is E3 and the threshold is T3. Again, the threshold T3 is equal to the signal energy E3. In the frame where noise ends, the threshold remains at T3. Since the signal energy in the last noise frame is lower than the threshold T3, ringback detection circuit 100 mistakenly determines that ringback is not present, as seen in FIG. 6C. To avoid this potential problem, $\beta$ may be set to a value less than 1 as shown in FIGS. 6D and 6E. As shown in FIG. 6D, the signal energy in the frame preceding noise is E4 and the threshold is T4. In the first noise frame, both the signal energy and threshold increase to E5 and T5, respectively. However, the threshold T5 is still a fraction of the energy E5. In the first full frame of noise, the total signal energy has increased to E6 and the threshold has increased to T6. The signal energy begins decreasing in the last noise frame and ultimately returns to its original value, E4. It is to be noted that the threshold is not adjusted downward during the call but instead remains at T6. Since the threshold T6 is less than E4, ringback detection circuit 100 continues to indicate ringback as seen in FIG. 6E.

Figure 7:
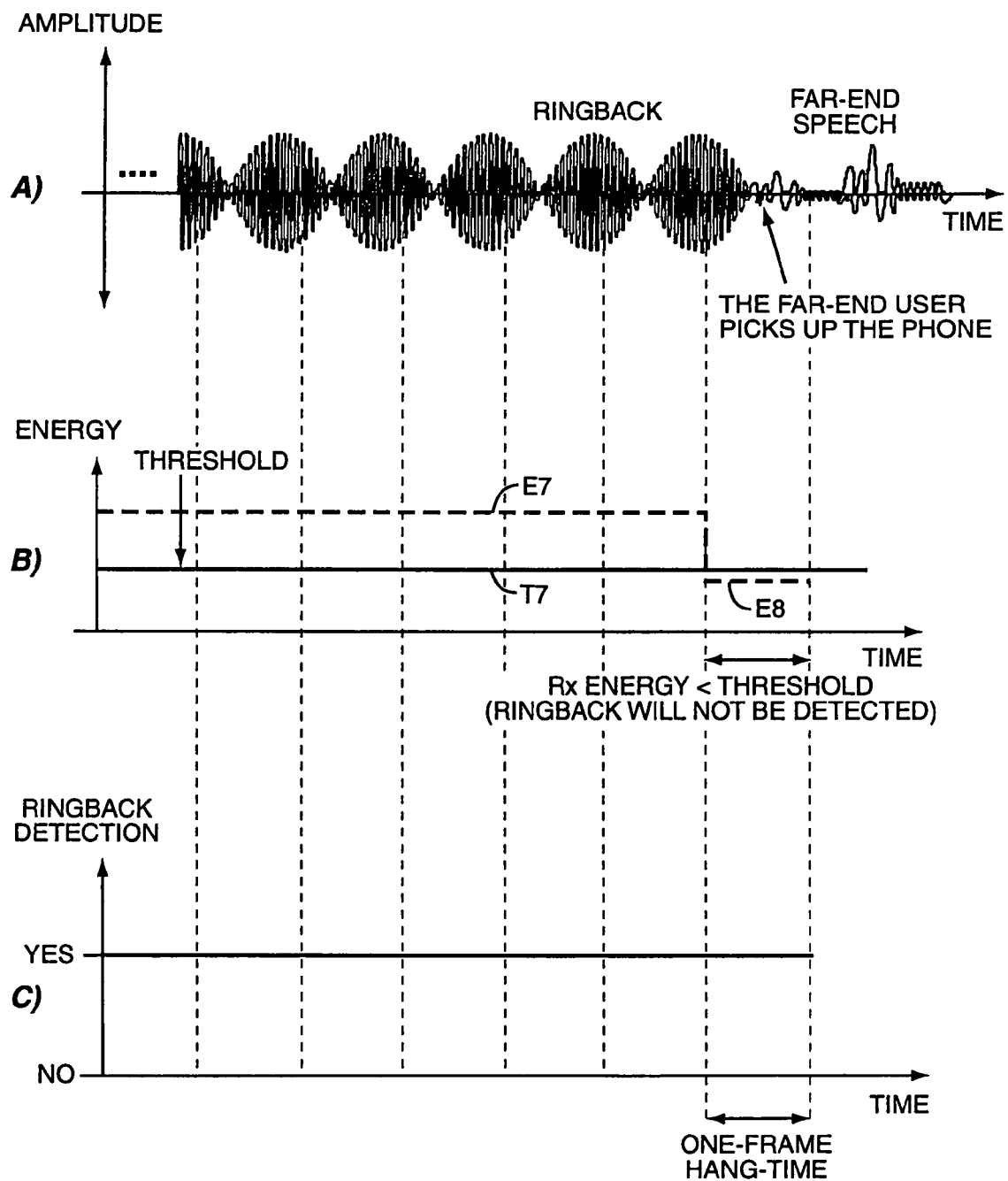
FIGS. 7A through 7C are time diagrams illustrating the operation of the ringback detection circuit when a call connects.

Just as ringback doesn't necessarily begin at a frame boundary, it likewise doesn't necessarily end at a frame boundary. The tail end of the ringback signal, i.e., the portion of the ringback signal in the last frame of ringback, contributes to the total signal energy. This effect is seen in FIGS. 7A through 7C. FIG. 7A illustrates a ringback signal in the time domain followed by a voice signal after the call connects. Before the call connects and the ringback signal ends, the total signal energy is equal to E7 and the threshold is T7. In the frame where the call connects, the threshold remains at T7 while the total signal energy decreases to E8. Since the signal energy E8 is less than the threshold T7, the ringback detection circuit 100 outputs a signal indicating no ringback. While the energy of the ringback signal is below the threshold, it is nevertheless substantial enough to distort adaptive algorithms. To avoid this problem, ringback detection circuit 100 may be programmed to maintain its output for at least one frame so that the energy in the tail end of the ringback signal does not distort adaptive algorithms. That is, the ringback detection circuit 100 is programmed to continue indicating ringback until at least one frame following the determination that ringback has ended. While adding hang-time to transitions in the output of the ringback detection circuit 100 from true to false improves performance, it is not an essential aspect of the invention.

The use of signal energy, as opposed to peak detection, limits increases in the threshold due to glitches, so that ringback is successfully detected even after a high amplitude glitch. The filter further reduces the effect of glitch on the threshold. The use of signal energy as opposed to peak detection also decreases the probability of false ringback detection during voice. In some instances, such as when the far-end user is shouting, the energy measured could reach a value beyond the ringback threshold. Thus, shouting by the far-end user may cause the ringback detection circuit 100 to falsely indicate ringback. In this case, the false ringback detection is not likely to be a problem and, in fact, may be beneficial for network echo cancellers and noise estimators because they will not adapt during this short transient period. Moreover, shouting by the far-end user is likely to mask the network echo signal. Thus, if the residual echo suppressor 42 is set to by-pass mode during ringback as previously described, the user will not be able to detect the residual echo since it is masked by the far-end user's shouting.

Figure 8:
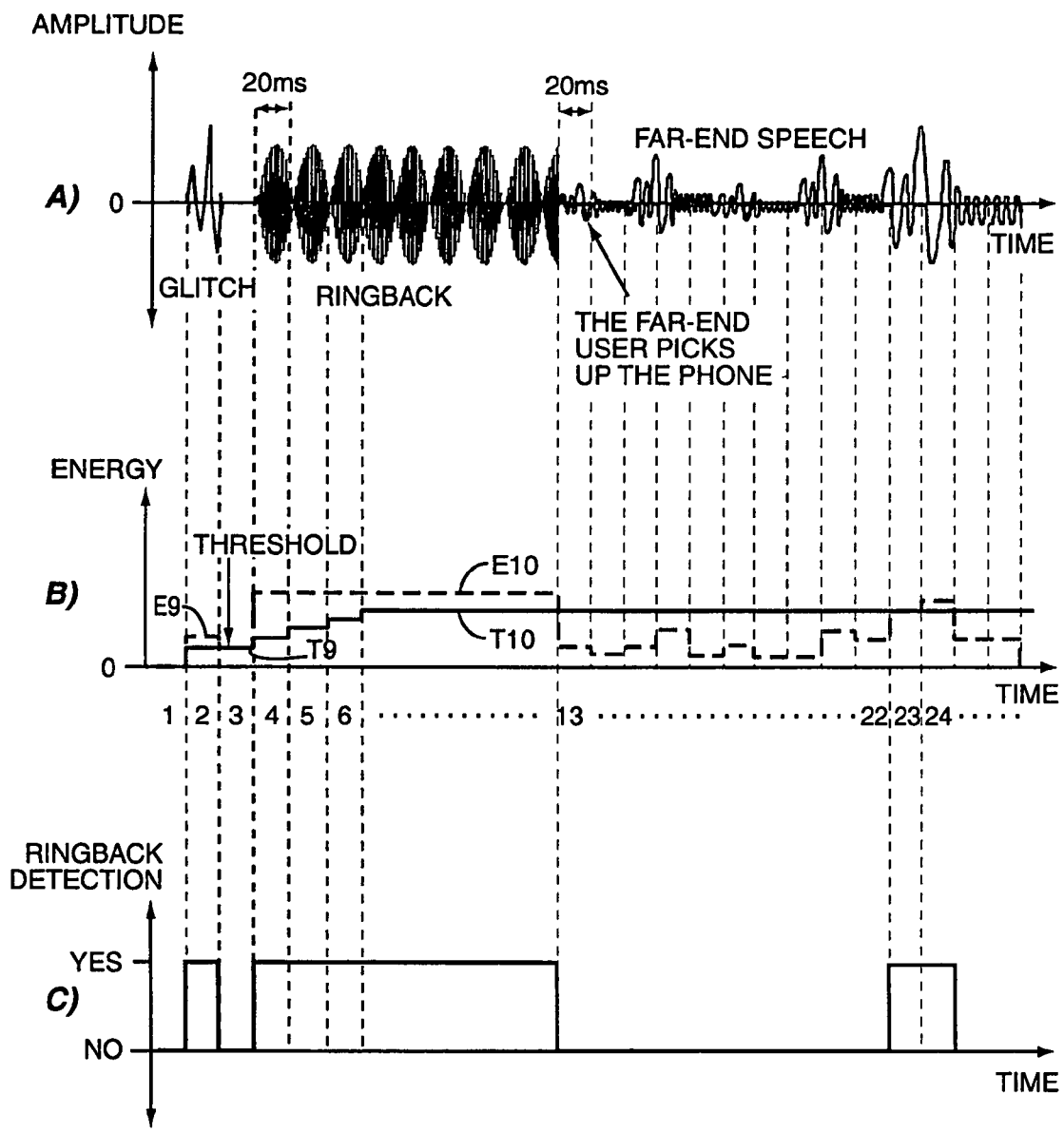
FIGS. 8A through 8C are time diagrams illustrating the operation of ringback detection circuit from the time a call is initiated until after the call connects.

FIG. 8 illustrates some of the advantages of the ringback detection circuit 100. FIG. 8A illustrates the received signal at the mobile terminal 10. A glitch in the received signal occurs during the second frame. Ringback begins during the fourth frame and the call is answered during the thirteenth frame. The far-end user is shouting in the twenty-second through twenty-fourth frames. FIG. 8B illustrates the energy of the received signal and threshold. The energy of the glitch during the second frame is E9 and the threshold is computed to be T9. As shown in FIG. 8C, the output of the ringback detection circuit 100 indicates ringback. The glitch disappears prior to the third frame so the energy of the received signal decreases below the threshold T9 causing the ringback detection circuit 100 to indicate no ringback. Ringback begins during the fourth frame. The energy of the ringback signal is E10. During the fourth through seventh frames, the threshold gradually increases to T10. The output of the ringback detection circuit 100 indicates ringback in frames four through twelve. The call connects during the thirteenth frame and the voice signal begins. The energy of the fourth signal is substantially below the threshold and the ringback detection circuit 100 indicates no voice. In the twenty-third and twenty-fourth frames, the energy in the voice signal meets or exceeds the threshold, causing the ringback detection circuit 100 to indicate ringback. In this case, adaptive algorithms such as noise estimators and echo cancellers are "frozen." Also, the residual echo suppressor 42 may be disabled.

The present invention compares signal energy to a threshold to determine the presence of ringback. Energy in the strictest sense is equal to the sum of the squares of the received signal over a predetermined time period. In a broader sense, the term energy may describe other measures of energy, such as the root mean square, sum of absolute values, peak values, or norm of the received signal over the predetermined time period. As used herein the term energy is intended to have this broader meaning. Measures of properties or characteristics of the received signals other than energy may also be used to practice the invention. Whatever measure is used, the threshold is set initially to a low value and then increased over time based on measure of the selected property or characteristic.

Also, the term ringback as used above refers to the tone heard by a calling party after dialing but before the call is answered by the called party. As explained above, the ringback detector may also detect other high amplitude tones, such as DTMF tones and unusually loud speech that are received by the receiver. For purposes of the claims, the term ringback shall be construed to include these other high amplitude tones. Thus, use of the ringback detector set forth in the claims to detect these other high amplitude tones is within the scope of the following claims.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for detecting ringback in a received signal, said method comprising:
   calculating a current value of signal energy of said received signal;
   determining a current ringback detection threshold from the current value of signal energy;
   comparing the current ringback detection threshold to a previous ringback detection threshold and selecting one of them as an adaptive ringback detection threshold;
   determining whether ringback is present in said received signal by comparing said current value of signal energy to said adaptive ringback detection threshold;
   storing the adaptive ringback detection threshold as the previous ringback detection threshold for use in a next comparison of current and previous ringback detection thresholds; and
   outputting a control signal indicating whether ringback is present in said received signal.

2. The method of claim 1 further comprising setting said adaptive ringback detection threshold to an initial value at the start of a call and adjusting said adaptive ringback detection threshold based on said current value of signal energy of said received signal.

3. The method of claim 1 wherein outputting a control signal comprises changing said control signal to a first state indicative of no ringback to a second state indicative of ringback when ringback is detected.

4. The method of claim 3 wherein changing said control signal further comprises changing said control signal from said second state indicative of ringback to said first state indicative of no ringback when ringback is no longer detected.

5. The method of claim 4 further including maintaining said control signal in said second state for a predetermined period of time after ringback is no longer detected before changing to said first state.

6. The method of claim 5 wherein using said control signal to control an audio processing circuit comprises changing the operating mode of said audio processing circuit.

7. The method of claim 6 wherein said audio processing circuit is a residual echo suppressor and whereon said control signal is used to place said residual echo suppressor in a bypass mode.

8. The method of claim 1 further comprising using said control signal to control an audio processing circuit.

9. The method of claim 8 wherein using said control signal to control an audio processing circuit comprises freezing an adaptive algorithm within said audio processing circuit when ringback is detected.

10. The method of claim 9 wherein said adaptive algorithm is a voice activity detector.

11. The method of claim 9 wherein said adaptive algorithm is an acoustic echo canceller.

12. The method of claim 9 wherein said adaptive algorithm is a network echo canceller.

13. The method of claim 9 wherein said adaptive algorithm is a noise estimator.

14. The method of claim 9 wherein said adaptive algorithm is a channel gain estimator.

15. The method of claim 9 wherein said adaptive algorithm is a noise suppressor.

16. The method of claim 1 wherein determining the current ringback detection threshold comprises:
filtering said current value of signal energy to determine a filtered energy;
filtering said previous ringback detection threshold to determine a filtered threshold; and
combining said filtered energy and said filtered threshold to calculate the current ringback detection threshold.

17. A ringback detector comprising:
an energy calculator to calculate a current value of signal energy of a received signal;
a threshold calculator configured to calculate a current ringback detection threshold based on said current value of signal energy and to select one of the current ringback detection threshold and a previous ringback detection threshold as an adaptive ringback detection threshold based on a comparison between said current ringback detection threshold and said previous ringback detection threshold; and
a comparator to compare said current value of signal energy to the adaptive ringback detection threshold to determine whether ringback is present in the received signal and to generate a control signal indicative of ringback based on said comparison.

18. The ringback detector of claim 17 wherein said control signal output from said comparator assumes a first state indicative of no ringback when ringback is not detected and assumes a second state indicative of ringback when ringback is detected.

19. The ringback detector of claim 18 further comprising a hang-time element to delay for a predetermined period after ringback is no longer detected the change of said control signal from said second state indicative of ringback to said first state indicative of no ringback.

20. The ringback detector of claim 17 wherein said threshold calculator comprises:
a filter circuit configured to calculate the current ringback detection threshold by combining a filtered version of said current value of signal energy with a filtered version of said previous ringback detection threshold; and
a comparison circuit configured to compare the previous ringback detection threshold and the current ringback detection threshold to select the adaptive ringback detection threshold.

21. A communications terminal comprising:
a receiver for receiving signals transmitted from a remote location;
an audio processing circuit to process audio signals contained in said received signal; and
a ringback detector to determine whether ringback is present in said received signal, said ringback detector including:
an energy calculator to calculate a current value of signal energy of a received signal;
a threshold calculator configured to calculate a current ringback detection threshold based on said current value of signal energy and to select one of the current ringback detection threshold and a previous ringback detection threshold as an adaptive ringback detection threshold based on a comparison between said current ringback detection threshold and said previous ringback detection threshold; and
a comparator to compare the current value of signal energy to the adaptive ringback detection threshold to determine whether ringback is present in the received signal and to generate a control signal indicative of ringback to control said audio processing circuit.

22. The communications terminal of claim 21 wherein said audio processing circuit includes a voice activity detector.

23. The communications terminal of claim 21 wherein said audio processing circuit includes an acoustic echo canceller.

24. The communications terminal of claim 21 wherein said audio processing circuit includes a network echo canceller.

25. The communications terminal of claim 21 wherein said audio processing circuit includes a noise estimator.

26. The communications terminal of claim 21 wherein said audio processing circuit includes a channel gain estimator.

27. The communications terminal of claim 21 wherein said audio processing circuit includes a noise suppressor.

28. The communications terminal of claim 21 wherein said audio processing circuit includes a residual echo suppressor.

29. The communications terminal of claim 21 wherein said threshold calculator comprises:
- a filter circuit configured to calculate the current ringback detection threshold by combining a filtered version of said current value of signal energy with a filtered version of said previous ringback detection threshold; and
- a comparison circuit configured to compare the previous ringback detection threshold and the current ringback detection threshold to select the adaptive ringback detection threshold.

30. A method of detecting ringback in a received signal, said method comprising:
- initializing an adaptive ringback detection threshold to an initial value;
- detecting whether ringback is present in the received signal by comparing a signal energy calculated in each of one or more successive frames of the received signal to the adaptive ringback detection threshold; and
- adapting the adaptive ringback detection threshold over the one or more successive frames of the received signal as a function of the signal energy calculated in each frame, wherein adapting the adaptive ringback detection threshold comprises calculating a current ringback detection threshold based on the calculated signal energy and selecting one of the current ringback detection threshold and a previous ringback detection threshold based on a comparison between the current ringback detection threshold and the previous ringback detection threshold.

31. The method of claim 30 wherein calculating the current ringback detection threshold comprises:
- filtering said calculated signal energy to determine a filtered energy;
- filtering said previous ringback detection threshold to determine a filtered threshold; and
- combining said filtered energy and said filtered threshold to calculate the current ringback detection threshold.

* * * * *